(12) United States Patent
Junak et al.

(10) Patent No.: US 8,841,813 B2
(45) Date of Patent: Sep. 23, 2014

(54) BRUSHLESS SYNCHRONOUS MOTOR HAVING A PERIODICALLY VARYING AIR GAP

(75) Inventors: Jacek Junak, Hoechberg (DE); Grzegorz Ombach, Veitshöchheim (DE)

(73) Assignee: Brose Fahrzeugteile GmbH & Co. Kommanditgesellschaft, Wuerzburg, Wuerzurg (DE)

( * ) Notice: Subject to any disclaimer, the term of this patent is extended or adjusted under 35 U.S.C. 154(b) by 99 days.

(21) Appl. No.: 13/437,043

(22) Filed: Apr. 2, 2012

(65) Prior Publication Data

US 2012/0256514 A1  Oct. 11, 2012

Related U.S. Application Data

(63) Continuation of application No. PCT/EP2010/004207, filed on Jul. 9, 2010.

(30) Foreign Application Priority Data

Oct. 2, 2009  (DE) .................. 10 2009 048 116

(51) Int. Cl.
*H02K 1/14* (2006.01)
*H02K 1/08* (2006.01)
*H02K 23/42* (2006.01)
*H02K 1/27* (2006.01)

(52) U.S. Cl.
CPC .............. *H02K 1/276* (2013.01); *H02K 1/146* (2013.01); *H02K 2213/03* (2013.01)
USPC ...... 310/216.093; 310/216.092; 310/216.096; 310/216.097

(58) Field of Classification Search
CPC ..... H02K 21/025; H02K 23/42; H02K 29/03; H02K 1/146
USPC ............... 310/216.092, 216.093, 216.096, 310/216.097, 216.103, 156.53, 156.54, 310/156.56
See application file for complete search history.

(56) References Cited

U.S. PATENT DOCUMENTS

| | | | |
|---|---|---|---|
| 1,879,014 A * | 9/1932 | Austin et al. | ........... 310/184 |
| 4,030,005 A | 6/1977 | Doemen | |
| 4,429,263 A | 1/1984 | Müller | |
| 4,547,714 A | 10/1985 | Müller | |
| 5,041,749 A * | 8/1991 | Gaser et al. | ........... 310/156.22 |
| 5,469,005 A * | 11/1995 | Asama et al. | ........... 310/68 B |

(Continued)

FOREIGN PATENT DOCUMENTS

| | | |
|---|---|---|
| DE | 2346380 A1 | 11/1974 |
| DE | 20320959 U1 | 7/2005 |

(Continued)

*Primary Examiner* — Terrance Kenerly
(74) *Attorney, Agent, or Firm* — Laurence A. Greenberg; Werner H. Stemer; Ralph E. Locher

(57) ABSTRACT

A brushless synchronous motor includes a rotor having a number n of embedded permanent magnets and being rotatable relative to a stator having a number of stator teeth provided with a three-phase stator winding, while forming an air gap. An angle between two adjacent permanent magnets is $360°/n$ where $n>8$, an angle between two adjacent stator teeth is $360°/n+2$, and an inner contour of the stator facing the rotor has a curved structure with curvature valleys provided at ends of the stator teeth.

10 Claims, 3 Drawing Sheets

(56) References Cited

U.S. PATENT DOCUMENTS

| | | | |
|---|---|---|---|
| 6,181,047 B1 * | 1/2001 | Nitta | 310/216.001 |
| 6,208,054 B1 * | 3/2001 | Tajima et al. | 310/156.53 |
| 6,329,736 B1 * | 12/2001 | Bernauer et al. | 310/429 |
| 6,335,582 B1 | 1/2002 | Abukawa et al. | |
| 6,396,183 B1 * | 5/2002 | Tajima et al. | 310/156.53 |
| 6,822,368 B2 | 11/2004 | Maslov et al. | |
| 6,847,149 B2 | 1/2005 | De Filippis | |
| 6,946,760 B2 | 9/2005 | Crapo et al. | |
| 6,967,424 B2 * | 11/2005 | Popov | 310/216.023 |
| 6,984,909 B2 | 1/2006 | Kadoya et al. | |
| 7,339,301 B2 | 3/2008 | Chen et al. | |
| 2003/0107290 A1 * | 6/2003 | De Filippis | 310/216 |
| 2005/0023920 A1 | 2/2005 | Tajima et al. | |
| 2006/0279158 A1 | 12/2006 | Kim | |
| 2007/0018522 A1 | 1/2007 | Ackva et al. | |
| 2007/0241644 A1 * | 10/2007 | Kakugawa et al. | 310/67 R |
| 2009/0140590 A1 | 6/2009 | Hung | |

FOREIGN PATENT DOCUMENTS

| | | |
|---|---|---|
| DE | 60120680 T2 | 11/2006 |
| DE | 69834685 T2 | 5/2007 |
| DE | 102007038904 A1 | 3/2009 |
| EP | 0872943 A1 | 10/1998 |
| EP | 1492216 A1 | 12/2004 |
| EP | 1746707 A1 | 1/2007 |
| WO | 03105318 A1 | 12/2003 |

* cited by examiner

BRUSHLESS SYNCHRONOUS MOTOR HAVING A PERIODICALLY VARYING AIR GAP

CROSS-REFERENCE TO RELATED APPLICATION

This is a continuation, under 35 U.S.C. §120, of copending International Application No. PCT/EP2010/004207, filed Jul. 9, 2010, which designated the United States; this application also claims the priority, under 35 U.S.C. §119, of German Patent Application DE 10 2009 048 116.8, filed Oct. 2, 2009, 2009; the prior applications are herewith incorporated by reference in their entirety.

BACKGROUND OF THE INVENTION

Field of the Invention

The invention relates to a permanently excited brushless synchronous motor, having a stator which includes a number of stator teeth provided with a three-phase stator winding and having a rotor with a number (n) of embedded permanent magnets.

A synchronous motor of that kind, in particular an electronically commutated multi-pole three-phase motor, has a stator and a rotating part which is frequently described as an armature or rotor. The stator usually contains a laminated stator core which is made up of a multiplicity of individual laminations, and has stator teeth with stator slots provided between the stator teeth. The stator winding (wire turns of a winding wire) is fitted in the stator slots.

The radially progressing stator teeth are brought together in a yoke on the circumferential side and have lugs (pole lugs) on both sides pointing in the circumferential direction at the slot-entry-side tooth end which faces the air gap between the stator and the rotor. As a result, at the free ends opposite the yoke, the stator teeth, which point inwards towards the rotor in the manner of spokes, form circular-segment-shaped pole shoes which are usually very close together and which distribute the magnetic excitation field correspondingly in a circular-segment shape on the rotor.

The phase windings, which are usually made of copper, of a winding system of the stator (stator winding), which is usually three-phase, are fed around the stator teeth in accordance with a specified winding scheme with a defined number of turns. When the motor is operating, an electric current flows through these phase or stator windings. A rotating stator field which is produced as a result thereof interacts with the excitation field of the rotor to produce a torque which drives the rotor.

A permanently excited brushless synchronous machine, having an outer rotor contour which is formed in such a way that the electromagnetic force (EMF) induced in the single-tooth stator winding, also referred to as back EMF, has a trapezoidal characteristic, is disclosed in European Patent Application EP 1 746 707 A1, corresponding to U.S. Pat. No. 7,535,146.

Particularly in the case of a block-shaped terminal voltage resulting from a likewise block-shaped output current of an inverter, through the use of which the motor is supplied with a direct voltage, in conjunction with a trapezoidal EMF, the motor power can be increased by more than 12% compared with a motor with sinusoidal EMF, such as is produced with a symmetrical curved structure of the outer rotor contour as disclosed in German Patent Application DE 10 2007 038 904 A1. However, that increase in power has previously only been successful with 8-pole motors correspondingly having eight permanent magnets embedded in the rotor.

SUMMARY OF THE INVENTION

It is accordingly an object of the invention to provide a brushless synchronous motor, which overcomes the hereinafore-mentioned disadvantages of the heretofore-known motors of this general type and which also achieves a corresponding increase in power with a higher number of poles.

With the foregoing and other objects in view there is provided, in accordance with the invention, a brushless synchronous motor, comprising a stator having a number of stator teeth provided with ends and a three-phase stator winding, a rotor configured to rotate relative to the stator, the rotor having a number n of embedded permanent magnets, the stator and the rotor forming an air gap therebetween, the permanent magnets defining an angle between two adjacent permanent magnets of $360°/n$, where $n>8$, the stator teeth defining an angle between two adjacent stator teeth of $360°/n+2$, and the stator having an inner contour facing the rotor, the inner contour having a curved structure with curvature valleys provided at the ends of the stator teeth.

Although an electrical machine having a wound stator with twelve stator teeth and having a rotor provided with ten permanent magnets is disclosed in European Patent EP 0 872 943 B1, corresponding to U.S. Pat. No. 6,335,582 (and corresponding to German Translation DE 698 34 685 T2), it, like the stator, has a conventional circular, curvature-free contour. In a preferred embodiment of the servo motor according to the invention, the inner contour of the stator facing the air gap is provided with a curved structure which is preferably asymmetrical and, on its outer contour facing the air gap, the rotor is provided with a curved structure which, however, is appropriately symmetrical. In this case, the asymmetry of the curved stator structure relates to the radial axes of symmetry of the stator teeth, while the symmetry of the rotor is referred to the radial axes of symmetry of the permanent magnets.

The curved structure on the stator side is preferably formed in such a way that the air gap between the rotor and the stator teeth facing the rotor varies periodically between a maximum and a minimum when the rotor passes the stator teeth. For this purpose, the curved structure on the stator side is appropriately formed through the use of a curvature valley at the tooth end of each stator tooth. In this case—referred to the radial axis of symmetry of the stator tooth—the curvature valley is only provided on its one side.

As is known, particularly powerful torques can be achieved when the curvature valleys of two adjacent stator teeth face one another. A stator tooth then faces a stator tooth on the other side with that side which likewise has no curvature valley. This forms the preferred asymmetrical curved structure of the inner contour of the stator which faces the air gap.

In an expedient embodiment, the appropriately symmetrical curved structure of the rotor on its outer contour which faces the air gap reaches a maximum in the central region of each permanent magnet, i.e. in the region of its radial axis of symmetry. The curved structure on the rotor side reaches a minimum between two adjacent permanent magnets in each case. With such a structure, appropriately the air gap between the rotor and the stator tooth facing the rotor reaches a minimum when a maximum of the curved structure on the rotor side lies opposite the curved structure on the stator side outside the curvature valleys of the stator teeth. When a minimum of the curved structure on the rotor side lies opposite a curvature valley of the curved structure on the stator side, then the air gap is maximal at this point.

In a suitable embodiment of the permanently excited brushless synchronous motor, the number of embedded permanent magnets is ten (n=10), while the number of stator teeth is therefore twelve (m=n+2=12). Appropriately, the angle between the adjacent permanent magnets is therefore 36° in each case, while the angle between adjacent stator teeth is only 30°.

In a further embodiment of the brushless motor, the stator winding has three winding legs, each having at least four coils, of which two coils are in each case carried by two adjacent stator teeth as a coil pair. The two coil pairs of the same winding leg are expediently disposed diametrically opposite one another on the stator circumference, i.e. wound on the respectively adjacent stator teeth provided there. Coil insulation can be placed in the appropriate stator slots between adjacent coils of the same coil pair and/or between adjacent coils of adjacent coil pairs.

In turn, the other two coils then sit on two adjacent and diametrically opposed stator teeth. Since the three winding legs are in each case likewise formed by two coil pairs which sit on adjacent stator teeth in each case, a coil or winding pattern with consecutive coil pairs of each winding leg is produced in the circumferential direction of the stator on the half circumference, while the identical coil pair pattern then follows in the remaining half circumference.

For this purpose, the two coils of the respective winding leg can be wound continuously, i.e. without additional connections or connecting elements, to form a coil pair. If, in doing so, the coil pairs are provided with only two winding ends (coil pair ends), the two coils of each winding leg of the three-phase stator winding which are disposed on adjacent stator teeth together only have two winding ends to be connected. This reduces the number of connecting elements required and simplifies the winding of the stator. The three-phase stator winding with a total of six coil pairs therefore has only six winding ends compared with a three-phase stator winding with twelve individual coils. These winding ends can then be connected to one another in star or delta form with comparatively little effort.

Other features which are considered as characteristic for the invention are set forth in the appended claims.

Although the invention is illustrated and described herein as embodied in a brushless synchronous motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
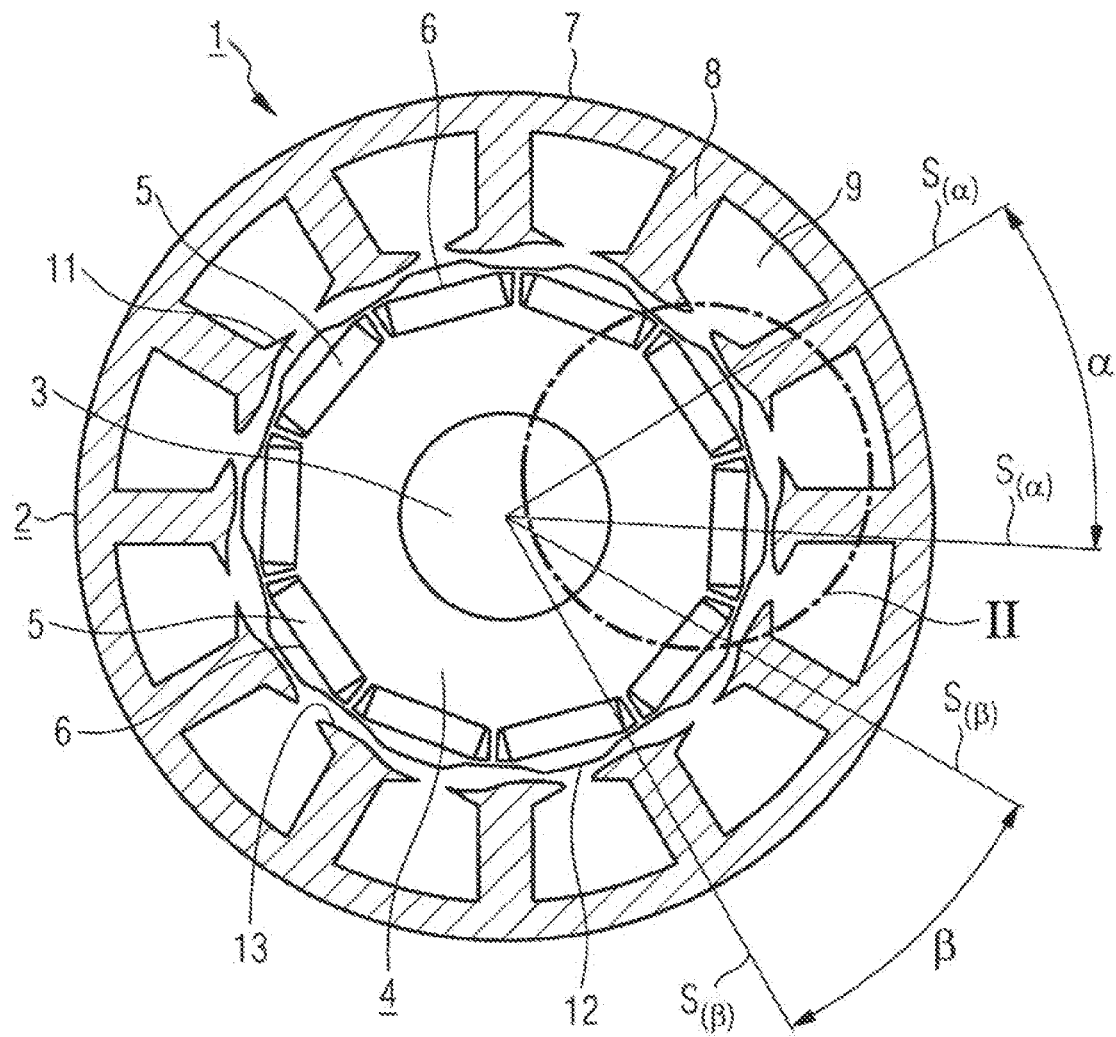
FIG. 1 is a diagrammatic, cross-sectional view of an electric motor according to the invention having a rotor which is structured on an outer circumference and having a likewise structured stator on an inner circumference.

Referring now in detail to the figures of the drawings, in which corresponding parts are given the same reference numerals, and first, particularly, to FIG. 1 thereof, there is seen a diagrammatic illustration of a brushless electric or synchronous motor 1, such as is used in motor vehicles, for example as a servo motor for assisting semi-automatic gearboxes or the like.

The synchronous motor 1 includes a stator 2 that coaxially encompasses a rotor 4 which sits on a motor shaft or rotor axis 3. The rotor 4 is made up of a laminated core and on an outer circumferential side has a number of permanent magnets 5 equal to ten (n=10). Within the rotor 4, individual laminations of the laminated core, which are stacked above one another, form a number of pockets 6 for accommodating the permanent magnets 5.

The stator 2, which can also be made of a laminated core with individual laminations stacked above one another, has a yoke 7 on the circumferential side and an even number of stator teeth 8 with stator slots 9 located between them. Every second stator tooth 8 carries a stator winding 10 (see FIG. 3).

The motor 1, which is fitted with ten permanent magnets 5 on the rotor side, therefore constitutes a preferred ten-pole electric motor 1 with twelve (m=n+2=12) stator teeth 8 and twelve stator slots 9. The motor 1 could also, for example, be constructed with twelve (n=12) permanent magnets, i.e. 12-pole, and with fourteen (m=14) stator teeth 8.

The preferred permanently excited brushless synchronous motor 1 with n=10 permanent magnets 5 on the rotor side and m=12 stator teeth 8 on the stator side has an angle α=360°/n=36° between adjacent permanent magnets 5 on the rotor side and an angle β=360°/n+2=30° between adjacent teeth 8 on the stator side. In this case, the respective angle α, β is measured between the radial axes of symmetry S(α) of the permanent magnets 5 and between the pictured radial axes of symmetry S(β) of the stator teeth 8.

Figure 2:
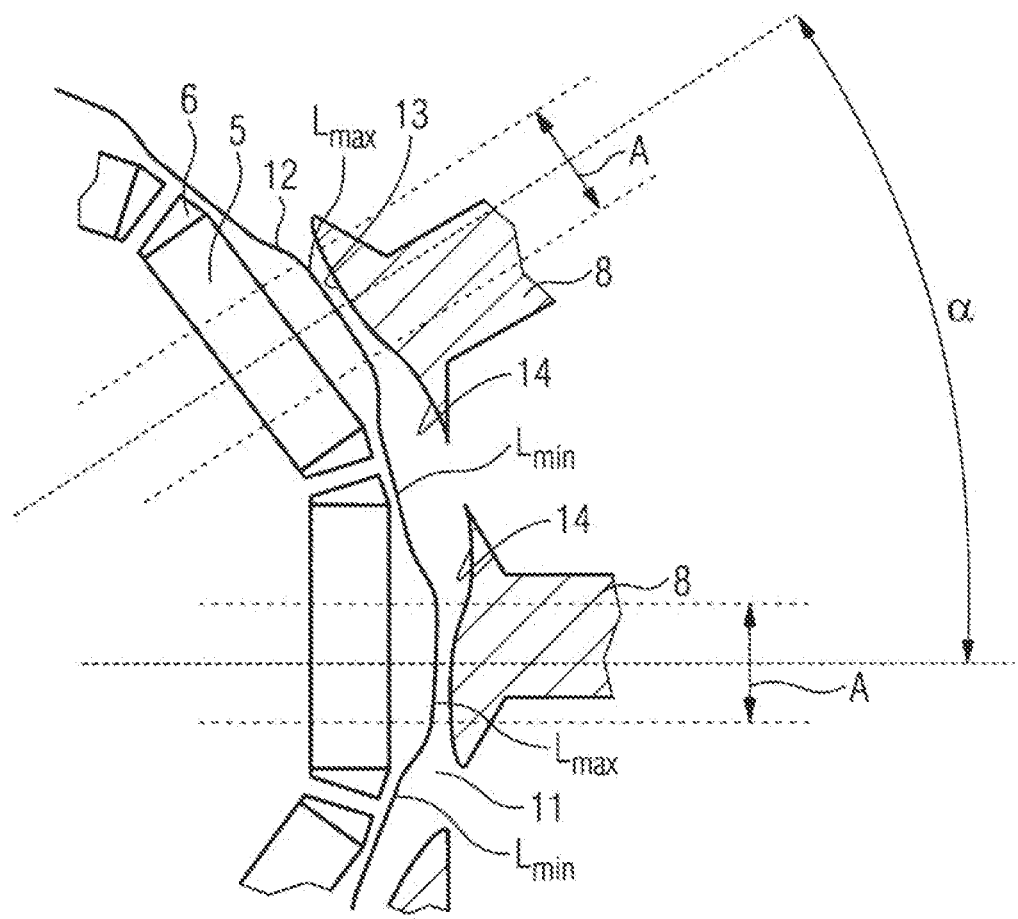
FIG. 2 is an enlarged, fragmentary, cross-sectional view of a portion II of FIG. 1 with two stator teeth lying opposite a rotor to form a minimum air gap.

As can be comparatively clearly seen from FIG. 2, the rotor 4 is constructed with a curved structure with periodically alternating maxima $L_{max}$ and minima $L_{min}$ on the circumferential side at an outer contour 12 of the rotor 4 which faces an air gap 11 between the stator 2 and the rotor 4. The maxima $L_{max}$ are formed by curves which are oriented towards the air gap 11 and the stator teeth 8 of the stator 2. The maxima $L_{max}$ of the curved structure on the rotor side extend symmetrically over a region A, which is approximately half of the tangential extent of the permanent magnets 5.

Each stator tooth 8 has a curvature valley 14 on its inner structure 13 which in turn faces the air gap 11. A structural region of the curved structure which is connected to the curvature valley 14 at the tooth end, i.e. in the region of the pole shoe of the respective stator tooth 8, is constructed in a uniformly circular manner and the tangential extension in the circumferential direction thereof overlaps the region A of the curved structure. When these regions A of the rotor-side and the stator-side curved structure are opposite one another, then the radial air gap 11 is minimal.

In this position of the rotor 4 with respect to the stator 2, the air gap 11, i.e. its radial extension or width in the region of the two mutually facing curvature valleys 14 of the adjacent stator teeth 8, is maximal when a minimum $L_{min}$ of the curved structure of the rotor 4 lies opposite the stator teeth 8 which are adjacent these two curvature valleys 14. Therefore, when a relative movement takes place between the rotor 4 and the stator 2, the radial extension of the air gap 11 varies periodically between a maximum value, when the two regions A of the stator tooth 8 and the maximum $L_{max}$ of the rotor outer contour 12 lie opposite one another, and a minimum value, when curvature valleys 14 of the curved structure on the stator side and minima $L_{min}$ of the curved structure on the rotor side lie opposite one another.

In such a 10-pole synchronous motor 1, the curved structure on the stator side, in particular in conjunction with the curved structure on the rotor side, enables a trapezoidal EMF and therefore in turn an increase in power to be provided as compared with conventional 10-pole synchronous motors with twelve stator teeth and twelve stator slots. Torque and therefore power increases of more than 6% are possible as compared with a sinusoidal EMF.

Figure 3:
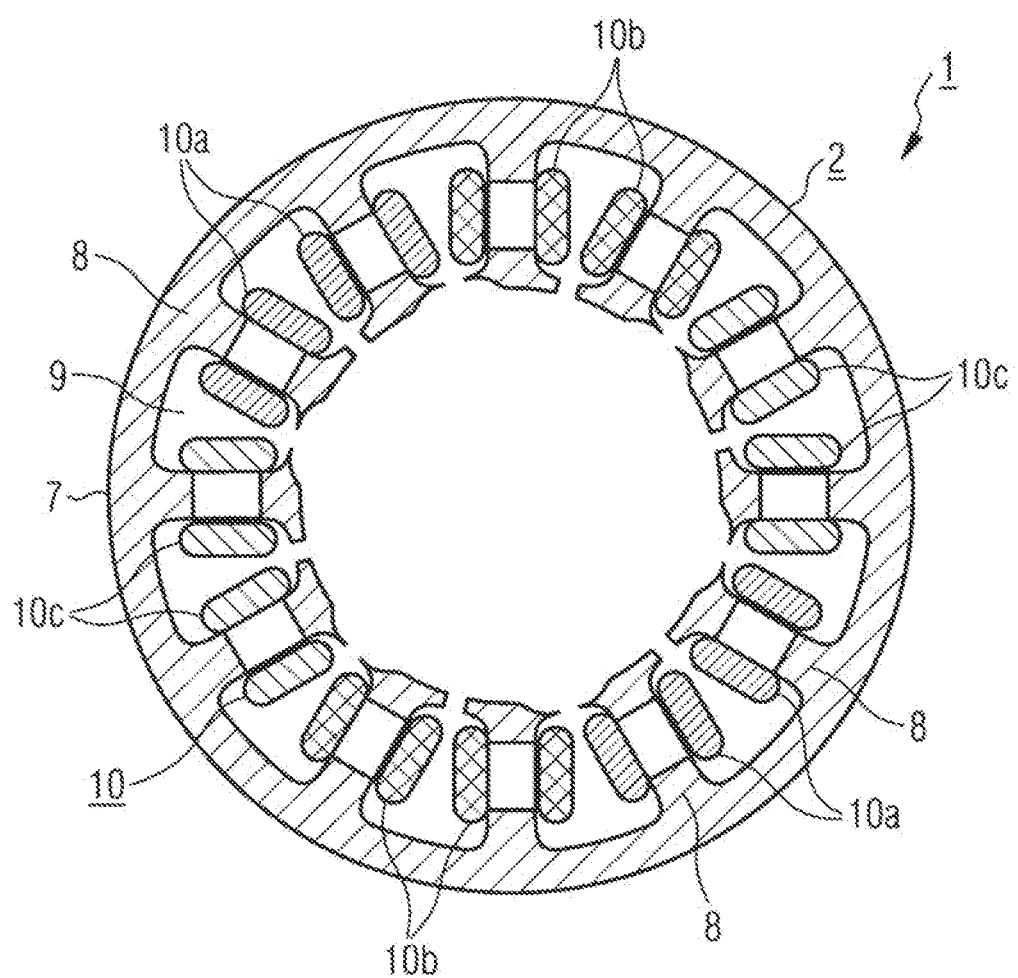
FIG. 3 is a view similar to FIG. 1 of the motor having a three-phase stator winding with opposing coil pairs of individual phase windings.

The asymmetrical curved structure on the stator side, in particular in conjunction with the symmetrical curved structure on the rotor side, is particularly suitable for a three-phase stator winding 10 shown in FIG. 3 having two coil pairs 10*a*, 10*b* and 10*c* per respective phase u, v, w, which are wound on the stator teeth 8 of the stator 2 in the example shown. In this case, each coil pair 10*a*, 10*b*, 10*c* of each respective phase u, v and w is wound on adjacent stator teeth 8. At the same time, the two coil pairs 10*a*, 10*b*, 10*c* of the same respective phase u, v and w are disposed on diametrically opposite stator teeth 8.

The invention claimed is:

1. A brushless synchronous motor, comprising:
   a stator having a number of stator teeth provided with ends and a three-phase stator winding;
   a rotor configured to rotate relative to said stator, said rotor having a number n of embedded permanent magnets;
   said stator and said rotor forming an air gap therebetween;
   said permanent magnets defining an angle between two adjacent permanent magnets of 360°/n, where n>8;
   said stator teeth defining an angle between two adjacent stator teeth of 360°/n+2; and
   each of said stator teeth having a curved inner surface facing said rotor, said curved inner surface of each of said stator teeth having one end with a curvature valley and another end with a curvature peak, said stator having an inner contour formed by said inner surface of each of said stator teeth.

2. The brushless synchronous motor according to claim 1, wherein said air gap varies periodically between said rotor and said stator teeth facing said rotor between a maximum value and a minimum value when said rotor passes said stator teeth.

3. The brushless synchronous motor according to claim 1, wherein said rotor has an outer contour facing said stator with a periodic curved structure oriented towards said stator teeth.

4. The brushless synchronous motor according to claim 3, wherein said permanent magnets have central regions, and said curved structure of said rotor reaches a maximum in said central region of each of said permanent magnets and a minimum between two adjacent permanent magnets.

5. The brushless synchronous motor according to claim 4, wherein said air gap between said rotor and said stator teeth facing said rotor reaches a minimum value when a maximum of said curved structure of said rotor lies opposite said curved structure of said stator outside said curvature valleys of said stator teeth.

6. The brushless synchronous motor according to claim 1, wherein said rotor has an outer contour facing said stator with a symmetrical curved structure, and said inner contour of said stator has an asymmetrical curved structure.

7. The brushless synchronous motor according to claim 1, wherein:
   said number n of embedded permanent magnets is n=10;
   said number of said stator teeth is m=n+2=12;
   said angle between two adjacent permanent magnets is α=36°; and
   said angle between two adjacent stator teeth is β=30°.

8. The brushless synchronous motor according to claim 1, wherein said stator winding has three winding legs each having at least four coils, and two of said at least four coils of each of said winding legs are each carried by a respective one of two adjacent stator teeth.

9. The brushless synchronous motor according to claim 8, wherein said two coils are disposed opposite another two coils of each respective winding leg.

10. The brushless synchronous motor according to claim 1, wherein said inner contour of said stator is formed as a continuous curve.

* * * * *